US005687138A

United States Patent [19]
Kimball et al.

[11] Patent Number: 5,687,138
[45] Date of Patent: Nov. 11, 1997

[54] METHODS OF ANALYZING STONELEY WAVEFORMS AND CHARACTERIZING UNDERGROUND FORMATIONS

[75] Inventors: Christopher V. Kimball, West Redding, Conn.; Pawel Lewicki, Jersey City, N.J.

[73] Assignee: Schlumberger Technology Corporation, Ridgefield, Conn.

[21] Appl. No.: 538,333

[22] Filed: Oct. 3, 1995

[51] Int. Cl.$^6$ .................................................. G01V 1/40
[52] U.S. Cl. ........................... 367/31; 73/152.05; 367/25
[58] Field of Search .................................. 367/25, 31, 35, 367/86; 181/105; 73/152.05

[56] References Cited

U.S. PATENT DOCUMENTS

| | | | |
|---|---|---|---|
| 4,797,859 | 1/1989 | Hornby | 367/31 |
| 4,813,028 | 3/1989 | Liu | 367/31 |
| 4,850,450 | 7/1989 | Hoyle et al. | 181/102 |
| 4,858,198 | 8/1989 | Weissman | 367/31 |
| 4,964,101 | 10/1990 | Liu et al. | 367/31 |
| 5,036,945 | 8/1991 | Hoyle et al. | 181/104 |
| 5,043,952 | 8/1991 | Hoyle et al. | 367/159 |
| 5,278,805 | 1/1994 | Kimball | 367/32 |

OTHER PUBLICATIONS

Winkler et al., "Borehole Stoneley Waves and Permeability: Laboratory Results", Schlumberger article Sep. 1989.
Rosenbaum, "Synthetic Microseismograms: Logging in Porous Formations", *Geophysics*, vol. 39, No. 1 (Feb. 1974), pp. 14–32.
Williams, et al., "The Long Spaced Acoustic Logging Tool" Mobil Research and Development Corporation, Dallas, Texas, *SPWLA Twenty–Fifth Annual Logging Symposium*, (Jun. 10–13, 1984).
Kelly, E. J. Jr. and Levine, M. J., "Signal Parameter Estimation for Seismometer Arrays" *Massachusetts Institute of Technology, Lincoln Laboratory*, Technical Report 339, (Jan. 8, 1964).
Burns, D.R. and Cheng, C.H., "Determination of In–Situ Permeability from Tube Wave Velocity and Attenuation" SPWLA Twenty–Seventh Annual Logging Symposium, KK (Jun. 9–13, 1986).
Hsui, et al., "Tube Wave Attenuation and In–Situ Permeability", SPWLA Twenty–Sixth Annual Logging Symposium, (Jun. 17–20, 1985).
J.J. Staal, "Permeability Profiles from Acoustic Logging", SPE 6821 (1977).

*Primary Examiner*—Ian J. Lobo
*Attorney, Agent, or Firm*—Martin D. Hyden; Brigitte L. Jeffery; Keith G. W. Smith

[57] ABSTRACT

A method of analyzing Stoneley waveforms obtained in a well logging operation, includes analyzing the waveforms by means of multiparameter inversion using one or more externally provided parameters to obtain borehole fluid slowness and borehole fluid attenuation, and analyzing the Stoneley waveforms by multiparameter inversion using the borehole fluid slowness and borehole fluid attenuation and the externally provided parameters so as to determine a parameter, such as mobility, related to permeability of the formation being logged. Complex conjugate back propagation using a maximum likelihood/least mean squares error estimator or by applying Prony's method and fitting model-derived dispersion curves can be used to obtain mobility.

13 Claims, 4 Drawing Sheets

METHODS OF ANALYZING STONELEY WAVEFORMS AND CHARACTERIZING UNDERGROUND FORMATIONS

FIELD OF THE INVENTION

The present invention relates to the analysis of sonic well logging signals for the purpose of determining parameters, such as mobility, related to the permeability of the underground formations being logged. In particular, the invention relates to the analysis of Stoneley waveforms for such a purpose.

BACKGROUND OF THE INVENTION

Permeability is a critical parameter in determining the productivity of oil-bearing formations. It is conventionally measured by removing samples of the formation through, coring and then evaluating the cores in a laboratory. This is a slow and expensive process. In "Synthetic Microseismograms: Logging in Porous Formations", Geophysics, Vol. 39; No. 1 (February, 1974), J. H. Rosenbaum suggested that permeability could be measured acoustically by means of the Stoneley wave, a borehole acoustic mode, using Biot's theory to model the fluid saturated formation. Such measurements of permeability from Stoneley are potentially faster, less expensive, and more thorough than core measurements. An example of such a technique is disclosed in U.S. Pat. No. 4,964,101 ("the '101 patent", incorporated herein by reference) which proposes a model based on Biot's theory relating Stoneley phase slowness to a number of parameters including permeability (mobility). It has been proposed to use this model by conducting calibration measurements in regions of no permeability and known permeability so as to derive a complex dispersion curve. This is compared with complex dispersion curves from the model parameterized by permeability. The permeability of the best-fitting model dispersion curve is the permeability estimate for the formation. Suitable borehole logging tools for performing such measurements can include a monopole source, two dipole sources and an array of receivers and are described in U.S. Pat. Nos. 4,850,450, 5,036,945 and 5,043,952 all of which are incorporated herein by reference.

This approach and others relating permeability to Stoneley slowness often suffer from errors in the estimate of permeability which can sometimes be as high as 260% total relative permeability error. It is an object of the present invention to provide a method which allows this error to be reduced.

SUMMARY OF THE INVENTION

One aspect of the invention provides a method of characterizing underground formations comprising obtaining sonic well logging signals and extracting from the signals Stoneley waveforms which are analyzed to determine borehole fluid slowness and borehole fluid attenuation. The borehole fluid slowness and borehole fluid attenuation, which can be obtained in non-permeable regions of the well, are used to analyze the Stoneley waveforms obtained in other regions of the well to determine a parameter related to the permeability of the formation being logged.

Another aspect of the invention provides a method of analyzing Stoneley waveforms obtained in a well logging operation, comprising analyzing the waveforms by means of multiparameter inversion using at least one externally provided parameter to obtain borehole fluid slowness and borehole fluid attenuation, and analyzing the Stoneley waveforms by multiparameter inversion using the borehole fluid slowness and borehole fluid attenuation and at least one externally provided parameter so as to determine a parameter related to permeability of the formation being logged.

The analysis of Stoneley waveforms incorporates the complex phase slowness from frequency domain spectra so as to include attenuation as well as time delay in the analyzed data. The externally provided parameters used in the processing include parameters such as hole diameter which can be measured independently of the Stoneley waveform data or can be assumed or calculated from other data.

A back propagation analysis is used to determine values of unknown parameters in the present invention, various values of the unknown parameters being tested to minimize the error between the back propagated value and the measured value of the Stoneley data.

DESCRIPTION OF THE PREFERRED EMBODIMENT

Figure 1:
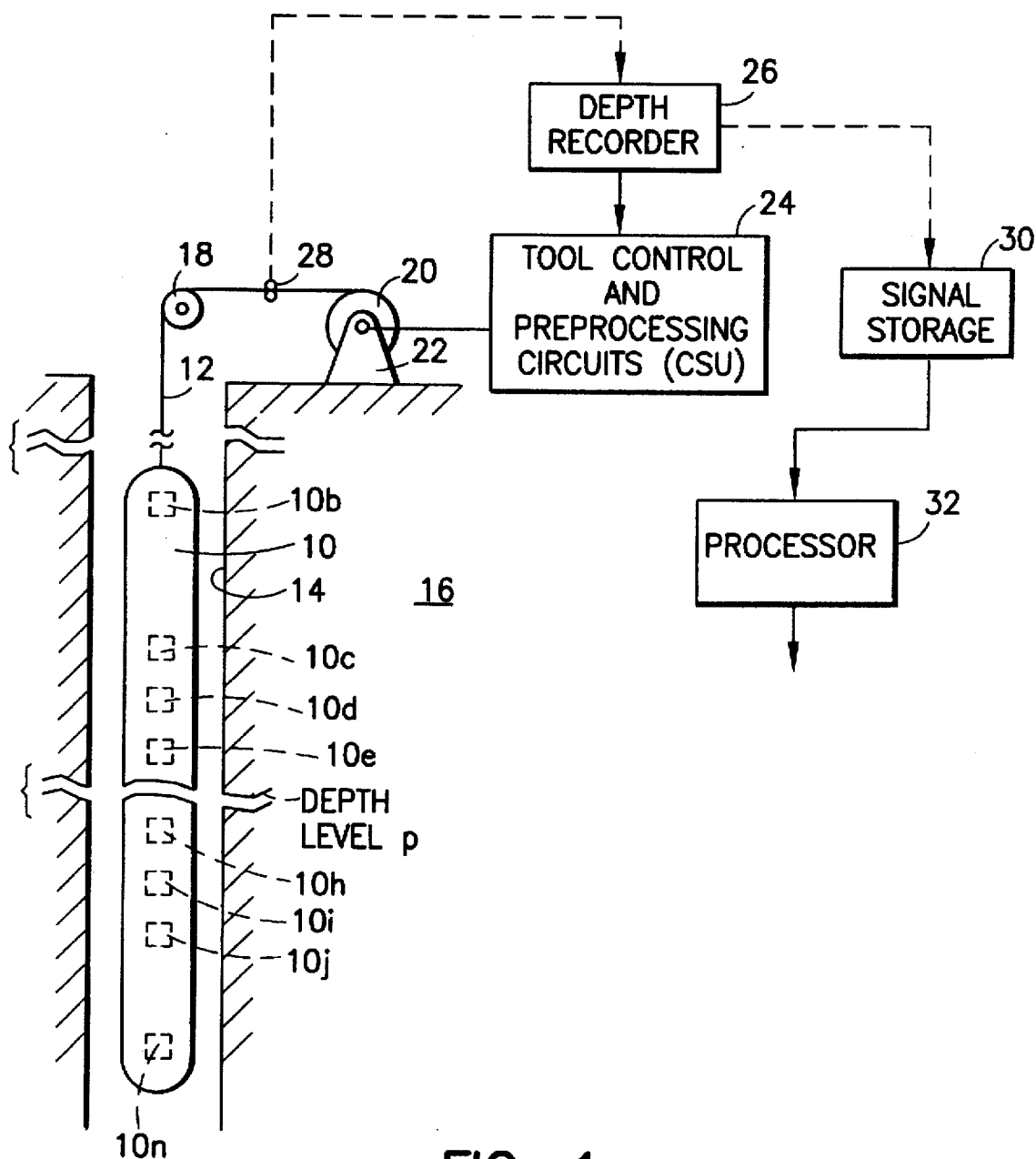
FIG. 1 shows a schematic illustration of a sonic well logging system for use in the present invention.

Referring to FIG. 1, an overall schematic illustration of a well logging system is shown to which the methods of the present invention can be applied. A sonic tool 10 is shown lowered on an armoured multiconductor cable 12 into an uncased part of a borehole 14 (other parts of which might be cased) to make sonic measurements of the subsurface formation 16. The tool 10 is provided with one or two monopole or dipole transmitters (two are shown 10a, 10b) and a plurality of monopole or dipole sonic receivers (eight are shown 10c–10j). The receivers are spaced along the tool from each other and from the transmitters. The distance between a transmitter and the closest receiver is typically much greater than the separation of adjacent receivers. For example, the separation of the transmitter and the closest receiver can be 5–25 ft depending upon requirements but the separation of adjacent receivers is typically ½–1 ft (less than half a wavelength of the sonic signal from the transmitter).

Tool 10 is adapted from movement up and down borehole 14, and as the tool 10 is moved, the transmitter 10a periodically generates a sonic signal, typically 0.5–2.0 kHz. The generated sonic signal travels through the borehole and/or through the formation, and the receivers typically detect some energy which results from the generated signal. The mechanism for moving the tool 10 in the borehole includes the cable 12 which extends to the sheave wheel 18 at the surface of the formation, and then to a suitable drum and winch mechanism 20 which raises and lowers the tool 10 in the borehole as desired. Electrical connection between transmitter 10a (and 10b) and receivers 10c–10j on the one hand, and the surface equipment on the other hand, is made through suitable a multi-element slipping and brush contact assembly 22 associated with the drum and winch mechanism 20. A unit 24 contains tool control and pre-processing circuits which send electrical signals to tool 10 and receive other electrical signals (sonic logs) therefrom via cable 12 and assembly 22. Unit 24 cooperates with a depth recorder 26 which derives depth level signals from depth measuring wheel 28 so as to associate the signals from receiver 10c–10j with respective depth levels in borehole 14. The outputs of sonic receivers 10c–10j, after optional preprocessing in unit 24, are sent to signal storage 30, which can also receive signals from or through depth recorder 26 so as to associate sonic receiver outputs with respective depth levels in the borehole 14. Storage 30 can store the outputs of sonic receivers 10c–10j in analog form but more typically stores them in the form of digital sonic log measurements, a set for each respective depth level, derived by digitizing such analog signals, for example in unit 24. Storage 30 can comprise a magnetic storage device such as a disk or tape, and/or other storage media such as semiconductor or equivalent memory circuits. In the case of tool 10 having eight receivers, eight respective waveforms of five hundred twelve digitized measurements each can be produced for every six inches of borehole, which translates to many millions of digitized log measurements for the typical borehole which is several thousand feet deep. Thus storage 30 should preferably have the capacity appropriate for the task. The processing of the digitized log measurements is then accomplished by a computer or processor 32 which processes the information in a manner which will be described below.

The processing according to the present invention uses a modified version of the model proposed in the '101 patent in which parameters relating to the mudcake density and mudcake compressional slowness are set to the same value as the borehole fluid, mudcake shear slowness is set to 1000 μs/ft and mudcake thickness is set to 0.05", and tortuosity $\alpha$ is set as the inverse of porosity $\phi$. This results in a 13 parameter model of the complex Stoneley dispersion curve, the parameters being as set out in the table below:

| Parameter | Value (typical) | Std. Dev. | Units |
|---|---|---|---|
| Borehole fluid density | 1.080 | 0.020 | gm/cm$^3$ |
| Hole diameter | 11.900 | 0.250 | in |
| Compressional slowness | 85.000 | 2.000 | μs/ft |
| Shear slowness | 144.000 | 3.00 | μs/ft |
| Porosity | 0.190 | 0.020 | |
| Formation bulk density | 2.370 | 0.020 | gm/cm$^3$ |
| Pore fluid density | 1.000 | 0.020 | gm/cm$^3$ |
| Formation grain modulus | 35.000 | 5.000 | GPa |
| Log pore fluid modulus | 0.35 | 0.300 | GPa |
| Log membrane stiffness | 0.700 | 0.300 | GPa/cm |
| Borehole fluid slowness | 197.200 | 3.000 | μs/ft |
| Borehole fluid attenuation | 0.080 | 0.500 | dB/λ |
| Log mobility | 2.000 | 0.300 | mDarcy |

Figure 2:
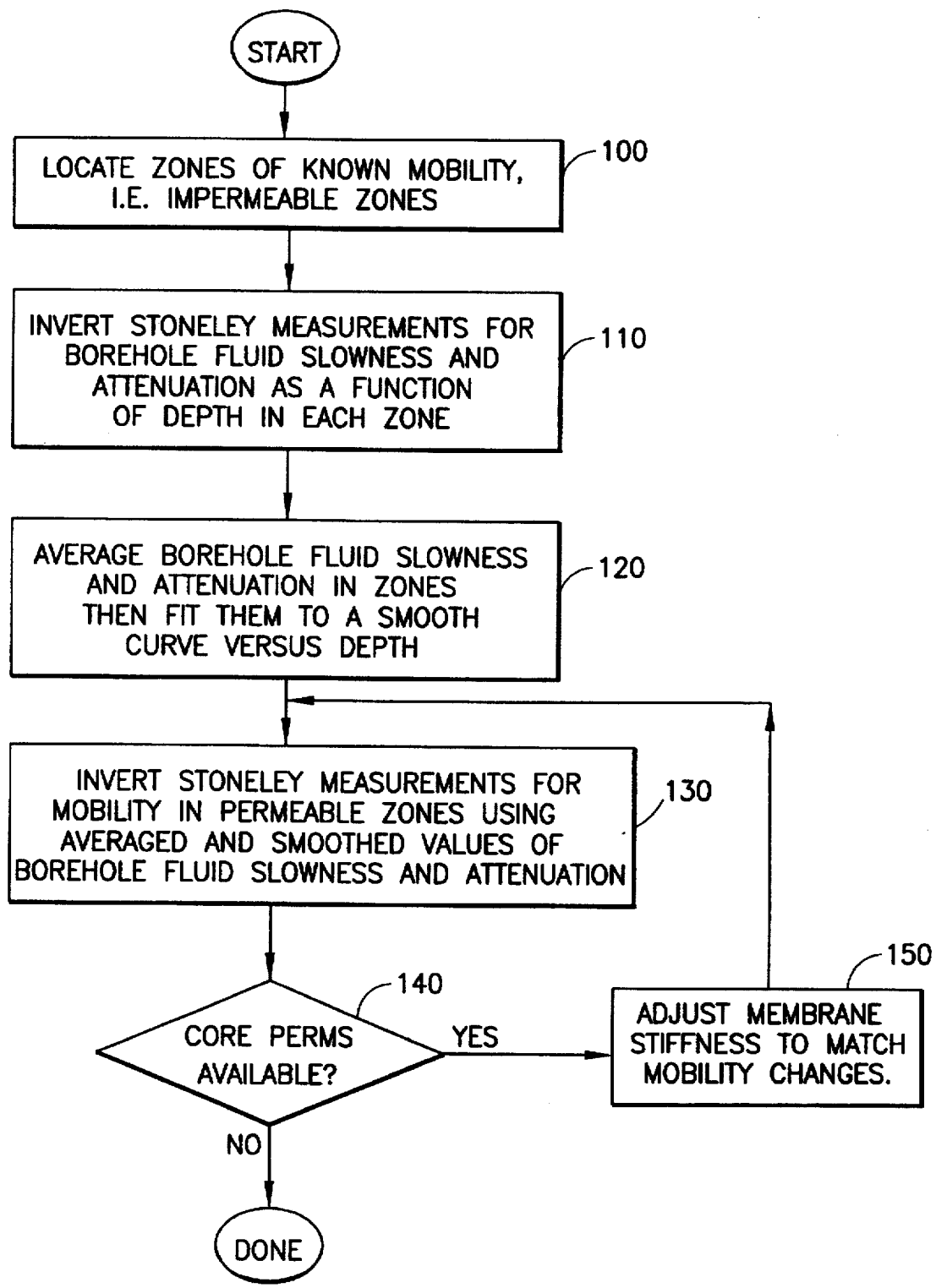
FIG. 2 shows a flow diagram setting out the steps of a method for determining mobility according to one aspect of the invention.

The general approach is shown in FIG. 2. The parameter of interest for characterizing the formations around the borehole is the mobility but in order to obtain this from the model, it is necessary to know borehole fluid slowness and borehole fluid attenuation as well as measuring the complex Stoneley dispersion curve. This is done using the same 13 parameter model from measurements made in regions where there is no permeability (mobility) or where the permeability is sufficiently low as to make little error in the result if it is ignored (100). Average values for borehole fluid slowness and borehole fluid attenuation are obtained by multiparameter inversion using the model (110) and fitted to a smooth curve versus depth (depth averaged) (120). Measurements are then taken in the permeable regions of interest and the depth averaged values of borehole fluid slowness and borehole fluid attenuation used in the inversion of the Stoneley measurements to derive the mobility (130). If core permeability measurements are available in the permeable zones (140), the membrane stiffness values can be adjusted to match changes in the mobility determination and the model inputs amended accordingly (150). The processing approach used is to estimate values of the parameters of interest (borehole fluid slowness and attenuation or mobility) apply them to the model to derive a complex dispersion curve, compare this with the measured data and determine the error between the two and revise the estimate of the parameter(s) to minimize this error.

There are two principal methods proposed for minimizing the error between the measured data and the complex phase slownesses generated from the model: maximum likelihood/ least means squares error (ML/LMSE) multiparameter inversion, and multiparameter inversion using Prony's method ( called "TKO" here). The inversions will be described in general theoretical terms below but can be implemented using suitable computer software such as MATLAB for analyzing the digitized log data obtained from the borehole.

This general ML/LMSE theory is commonly used in signal processing measurements and is well described, in general terms, by Scharf (Statistical Signal Processing: Detection, Estimation, and Time Series Analysis, Addison Wesley, 1991) and for non-dispersive waves by Kelly & Levin (Signal Parameter Estimation for Seismometer Arrays, Lincoln Laboratory, Massachusetts Institute of Technology, Technical Report 339, Jan. 8, 1964). In brief, an ML estimate corresponds to the parameter value having the greatest a posteriori probability; that is, after observation of the data. An LMSE estimate is the parameter value corresponding to the minimum mean-squared error between the observed data and model data. In the case considered here in which Gaussian noise is added to the signals, the ML and LMSE estimators are equivalent. The derivations also make the assumption of high signal-to-noise ratio. This assumption is compatible with practical array sonic operating conditions.

In the inversions proposed here, the structure of the ML/LMSE multiparameter estimator is well-known and conceptually similar to the DSTC processing described in U.S. Pat. No. 5,278,805 (incorporated herein by reference). The structure is the same for any parameterized wave described by a complex phase slowness. Waveforms are conjugate backpropagated according to the wave complex phase slowness for particular values of the estimated parameters (in the present case, borehole fluid slowness and attenuation or mobility depending on which part of the method is involved). An error measure (or semblance) is calculated after each backpropagation and the process is performed for alternative parameter values until a minimum error (or maximum semblance) is attained. The parameter values corresponding to the minimum error are taken as estimates.

Given the vector of physical parameters p, the noise-free signal at the i-th receiver is given by:

$$S_i(f) = A(f) \exp(j2\pi f \alpha(f, p)\delta_i)$$

where $f$ is the frequency, i=1, ..., M is the receiver number, $\delta_i$ is the distance from the first receiver to receiver i, $\delta_1$=0, $A(f)=S_1(f)$ is the complex spectrum a$^t$ the first receiver, and $\alpha(f,p)$ is the complex phase slowness at frequency $f$ for p. The received signal at receiver i is:

$$X_i(f) = S_i(f) + N_i(f)$$

where $N_i(f)$ is the noise.

The conjugate backpropagated waveform from the i-th receiver, assuming a physical parameter vector $\hat{p}$ is $$B_i(f,\hat{p}) = X_i(f) \exp(-j2\pi f \alpha^*(f,\hat{p})\delta_i)$$

The conjugate (*) is critical. A wave that is attenuated in going from receiver 1 to receiver i is further attenuated in the conjugate backpropagation.

For any estimated parameter $\hat{p}$ the semblance is $$\rho(\hat{p}) = \frac{\int_\beta \left| \sum_{i=1}^M B_i(f,\hat{p}) \right|^2 df}{\int_\beta R(f,\hat{p}) \sum_{i=1}^M |X_i(f)|^2 df}$$

where $$R(f,\hat{p}) = \sum_{i=1}^M \exp(-4\pi f \Im[\alpha(f,\hat{p})]).$$

The normalized mean-squared error is $$\epsilon^2(\hat{p}) = 1 - \rho(\hat{p}).$$

Note that if $\Im[\alpha(f,\hat{p})] = 0$ then $R(f,\hat{p}) = M$ and the semblance and normalized mean-squared errors reduce to their normal forms.

The Prony (TKO) method is an approximator to the ML/LMSE method described above. This is a suboptimal approach (in contrast with ML/LMSE which is an optimal approach) which applies Prony's method to the waveforms and then fits model dispersion curves to the result. The fitting is based on the ML/LMSE weighting of complex dispersion curve differences. A test statistic $\rho$ for the model derived phase slowness $\alpha$ with respect to the measured phase slowness $\alpha_0$ is derived according to the relationship:

$$\rho(\alpha) = 1 - \frac{m^2-1}{12} \delta^2 \frac{1}{U(\alpha_0)} \int_\beta |a(\omega)|^2 R(\alpha_0,\omega) \omega^2 B(\alpha_0,\omega) |\alpha - \alpha_0|^2 d\omega$$

$$= 1 - \int_\beta W(\alpha_0,\omega) |\alpha - \alpha_0|^2 d\omega$$

where $$W(\alpha_0,\omega) = \frac{m^2-1}{12} \delta^2 \frac{|a(\omega)|^2}{U(\alpha_0)} \omega^2 R(\alpha_0,\omega) B(\alpha_0,\omega)$$

$$= \frac{m^2-1}{12} \delta^2 \frac{|a(\omega)|^2}{U(\alpha_0)} \omega^2 C(\alpha_0,\omega)$$

$$U(\alpha_0) = \int |a(\omega)|^2 R(\alpha_0,\omega) d\omega$$

As $\Im(\alpha_0) \to 0$, then $U(\alpha_0) \to mU$, $R(\alpha_0, \omega) \to m$, $B(\alpha_0, \omega) \to 1$ and $C(\alpha_0, \omega) \to m$. In the preceding equations, m is the number of receivers, U is the signal energy in a single waveform, $\omega$ is frequency, $\delta$ is receiver spacing, a is amplitude, $\beta$ is the frequency band, $$R(\alpha,\omega) = \sum_{i=1}^m e^{-2\omega\delta i \Im[\alpha]}, \text{ and}$$

$$B(\alpha_0,\omega) = \frac{3}{m^2-1} [m^2(1-\coth^2 m u_0) - (1-\coth^2 \mu_0)]$$

where $u_0 = \omega\delta\Im(\alpha_0)$.

Figure 3:
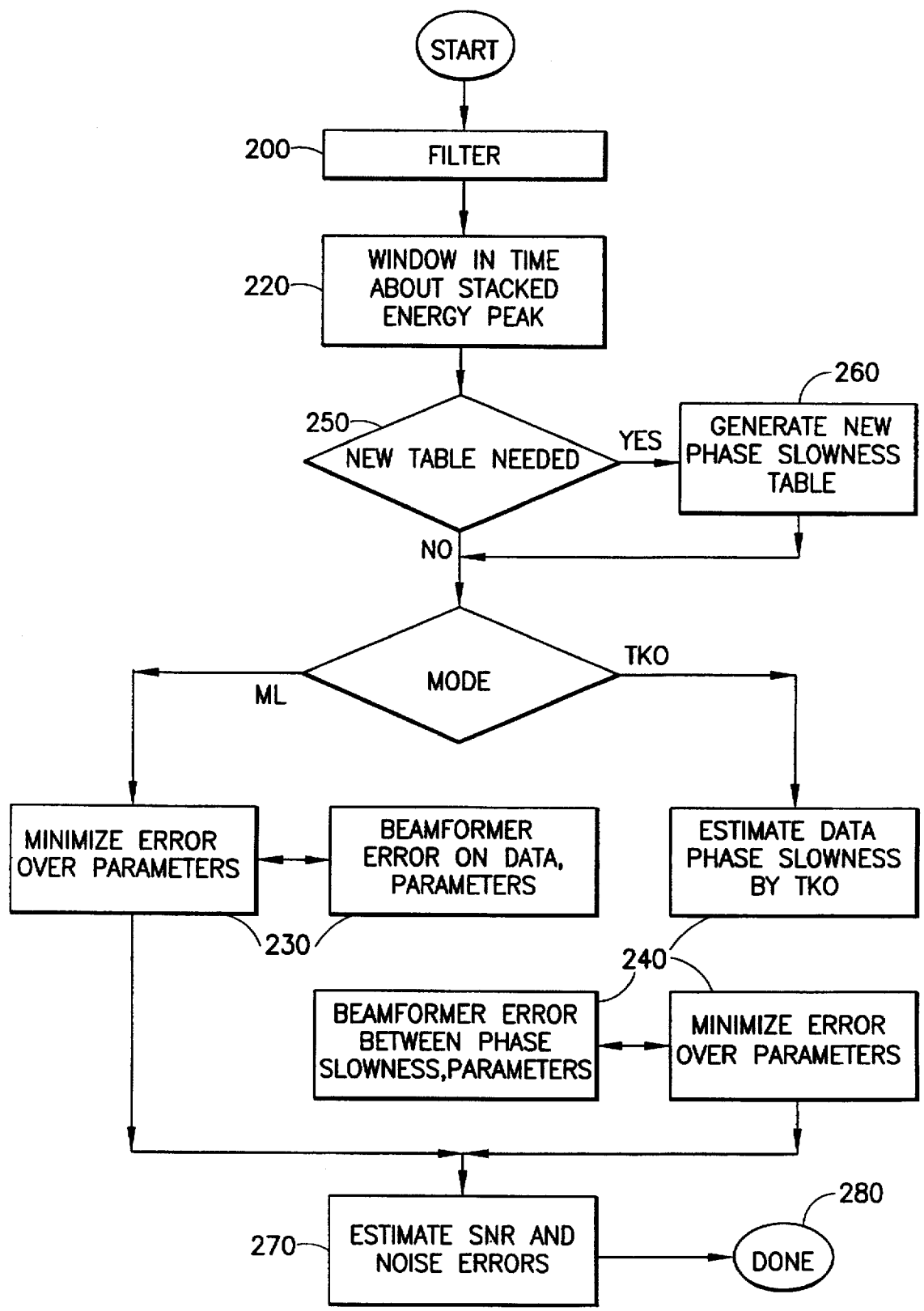
FIG. 3 shows a flow diagram setting out the steps of a method for multiparameter inversion.

The multiparameter inversion of measurements to obtain the parameters of interest (borehole fluid slowness and attenuation or mobility) is summarized in FIG. 3.

The waveforms contain data related to compressional, shear and Stoneley wave which have propagated from the transmitter to the receivers (200). Consequently, in order to perform the method of the present invention, Stoneley waveforms must be extracted from the waveforms received by the receivers. The received signals are filtered to the 1.5–4.5 kHz band with a 101 point "window method" filter and the Stoneley arrival identified. This is possible because the approximate Stoneley slowness is known and so the approximate arrival time can be calculated, and the Stoneley signal is strong compared to other arrivals around that time. A window position is located using the QDSTC approach described in the '805 patent (220). Because the processing of the signals requires the use of complex phase slowness values, a Gaussian window having a width of $\pm\sigma$ specified as an input parameter $T_w$ (1 ms) is centered on the QDSTC window so as to avoid the bias in the imaginary part of the phase slowness introduced by the use of a rectangular window. The Gaussian window in the frequency domain gives a 512 datapoint spectrum. The spectrum in the window is oversampled and so the data is decimated by a factor of 16 to reduce the number of phase slowness calculations required to analyze each frame of measurements.

Whichever processing mode is chosen, ML/LMSE (230) or TKO (240), for each estimation of the parameter(s) of interest it is necessary to derive a model phase slowness value to compare with the measured data. One way to do this is to compute the derived value from the model every time a new estimate is proposed. However, in order to reduce the number of computations required, a table can be constructed of computed slownesses for different values of the parameter (s) of interest and the derived value can be obtained by interpolation within the table. In the method according to the invention, in the first instance a series of values for complex phase slowness are calculated using the model for the particular external parameters extant at the first measurement. At the next measurement frame, for which different values for some or all of the externally provided parameters may be appropriate, a calculation of the error which would arise if the previous external parameter values were used is made (250) and if this error is below a predetermined threshold then the existing table is used. If the error is above the threshold, the values in the table are recalculated from the model (260) and this table used for interpolating the slowness values.

The processing described above provides not only an estimate of the parameter(s) of interest but also an indication of the error in that estimate. To provide either noise or total error bars an estimate of the input signal-to-noise ratio (SNR) must be available. Suitable methods are described in application Ser. No. 08/514,412 (incorporated herein by reference). The present method uses a high SNR approximation for the SNR from normalized mean-squared error in decibels, $\epsilon_{dB}^2$ (270):

$$SNR_{dB} = 10\log_{10}\left[2T_w W\left(\frac{M-1}{M}\right)k\right] - \epsilon_{dB}^2$$

where $T_w$ is the window $\pm\sigma$ length, W is the processing bandwidth ($f_{upper}-f_{lower}$) and M is the number of receivers. k is an empirical constant having a value of 1.1. The noise and total error standard deviations are computed with this estimate and provided as error bars for each estimated parameter.

The output from the processing scheme (280) can be represented as a conventional log on a screen or printout and can show values for mobility (or log mobility), errors and SNR, the latter two values allowing a qualitative determination of the estimated parameter.

The model considered above is formulated from the best available knowledge of the physics of Stoneley wave propagation. It is considered helpful to check the results obtained from this model against a relatively simple non-physical model in which the wave slowness S and attenuation LLDB (loss per wavelength) are fitted with a constant C as a function of frequency $f$ (as opposed to the non-constant fitting of the '101 "physical" model). The complex phase slowness $\alpha(f)$ for the simple, non-dispersive ("nd") model is given by:

$$\alpha(f) = S\left(1 + j\frac{LLDB}{2C}\right)$$

where $$LLDB = C\frac{1}{Q}$$

$$C = 10(2\pi)\log_{10}e$$
$$= 27.28753$$

Both the "nd" model and the "physical" model can be fitted to the same data either by beamforming or by an error measure between measured and model dispersion curves. If both models fit equally, then the data provides no information as to which model is appropriate for the data. If the physical model fits better than the nd model, the data supports the physical model. If the nd model fits better than the physical model, the physical model is more questionable. Hence comparisons of the fitting error between the physical model and the nd models provides a loggable assessment of the appropriateness of the physical model and so can be used as a quality check of the estimates.

Figure 4:
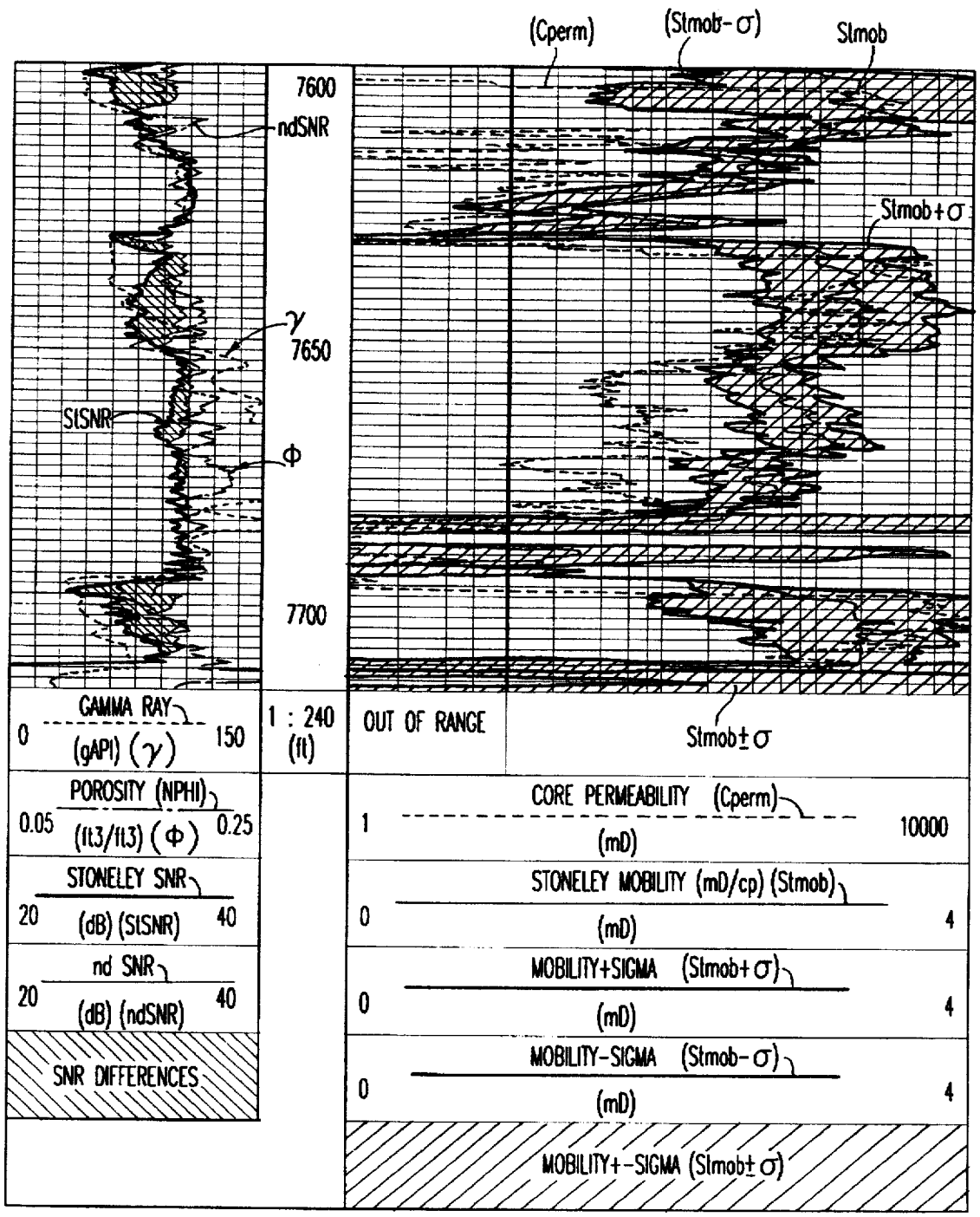
FIG. 4 show a sample log created using the methods according to the present invention.

FIG. 4 shows a sample log generated using the processing methods described above. On the right hand side values of Stoneley mobility (Stmob), Stoneley mobility+$\sigma$ (Stmob+$\sigma$) and Stoneley-$\sigma$ (Stmob-$\sigma$) are plotted on the same scale with core permeability (cperm) measurements (which are always different since there is no effect of pore fluid viscosity). The shading for Stoneley mobility $\pm\sigma$ gives one quality check for the estimate at any give depth. The left hand side shows traces for gamma ray ($\gamma$), porosity ($\phi$), nd model SNR (ndSNR) and physical model SNR (StSNR). Differences between the last two provide another quality check for the data.

We claim:

1. A method of analyzing, sonic waveforms used for characterizing underground formations surrounding a borehole, comprising:

a) transmitting and receiving sonic signals in the borehole;

b) extracting Stoneley waveforms from received sonic signals;

c) analyzing the Stoneley waveforms to determine borehole fluid slowness and borehole fluid attenuation; and d) using externally provided parameters and the borehole fluid slowness and borehole fluid attenuation determined from analysis of the Stoneley waveforms in the determination of a parameter related to the permeability of the formation.

2. A method as claimed in claim 1, wherein the parameter related to permeability comprises formation mobility (permeability/viscosity).

3. A method as claimed in claim 1, wherein the analysis of Stoneley waveforms to determine borehole fluid slowness and borehole fluid attenuation comprises analysis of waveforms obtained in formations which have substantially no permeability.

4. A method as claimed in claim 1, wherein Stoneley waveforms are extracted by, identifying parts of the waveform corresponding to Stoneley arrival, defining a window around the Stoneley arrival and applying a Gaussian window to the defined window to extract Stoneley waveforms in the frequency domain.

5. A method as claimed in claim 4, wherein the Stoneley waveforms comprise a spectrum of datapoints, the method further comprising applying a decimation factor to reduce the number of datapoints in the spectrum.

6. A method as claimed in claim 1, wherein the borehole fluid slowness and the borehole fluid attenuation are depth averaged along the well.

7. A method as claimed in claim 1, further comprising obtaining a determination of signal to noise ratio in the determined parameter and displaying values indicative of the determined parameter and the signal to noise ratio.

8. A method as claimed in claim 7, further comprising determining an error in the determined parameter which is displayed along with the values of the parameter and the signal to noise ratio.

9. A method as claimed in claim 1, wherein the borehole fluid slowness and borehole fluid attenuation are determined using a model which relates the borehole fluid slowness and borehole fluid attenuation and externally provided parameters to Stoneley complex phase slowness values, values for borehole fluid slowness and borehole fluid attenuation being obtained by applying estimated values of borehole fluid slowness and borehole fluid attenuation and the external parameters to the model, calculating Stoneley complex phase slowness values from the model, comparing the calculated values with the extracted Stoneley waveforms, determining the difference between the calculated complex phases slowness and measured waveforms and adjusting the estimated values of borehole fluid slowness and borehole fluid attenuation to minimize the difference.

10. A method as claimed in claim 9, wherein the step of calculating Stoneley slowness values comprises forming a table of a series of calculated Stoneley slowness values for a range of values of borehole fluid slowness and borehole fluid attenuation, and interpolating a calculated value of Stoneley slowness from the table for the estimated values of borehole fluid slowness and borehole fluid attenuation.

11. A method as claimed in claim 1, wherein the parameter related to the permeability is determined using a model which relates the parameter related to the permeability and externally provided parameters to Stoneley complex phase slowness values, values for the parameter related to the permeability being obtained by applying estimated values of the parameter related to the permeability and the external parameters to the model, calculating Stoneley complex phase slowness values from the model, comparing the calculated values with the extracted Stoneley waveforms, determining the difference between the calculated complex phase slowness and measured waveforms and adjusting the estimated value of the parameter related to the permeability to minimize the difference.

12. A method as claimed in claim 11, wherein the step of calculating Stoneley slowness values comprises forming a table of a series of calculated Stoneley slowness values for a range of values of the parameter related to the permeability, and interpolating a calculated value of Stoneley slowness from the table for the estimated values of the parameter related to the permeability.

13. A method as claimed in claim 1, further comprising calculating permeability values from core samples from the borehole, determining variation between permeability values from the core samples, and using the variation in the determination of the parameter related to permeability.

\* \* \* \* \*